March 18, 1930.  C. O. K. LAUBE  1,750,717
BOX MAKING MACHINE
Filed Jan. 26, 1927  9 Sheets-Sheet 1

INVENTOR
Clemens Otto Kurt Laube, deceased
Friedrich Bernhard Fischer, Executor.
By: Marks & Clerk
Attys.

March 18, 1930.   C. O. K. LAUBE   1,750,717
BOX MAKING MACHINE
Filed Jan. 26, 1927    9 Sheets-Sheet 2

Inventor:
Clemens Otto Kurt Laube, Deceased.
Friedrich Bernhard Fischer, Executor.
By: Marks & Clerk
Attys.

March 18, 1930.　　　C. O. K. LAUBE　　　1,750,717
BOX MAKING MACHINE
Filed Jan. 26, 1927　　　9 Sheets-Sheet 3

March 18, 1930. C. O. K. LAUBE 1,750,717
BOX MAKING MACHINE
Filed Jan. 26, 1927 9 Sheets-Sheet 4

Inventor
Clemens Otto Kurt Laube, Deceased
Friedrich Bernhard Fischer, Executor
By: Marks & Clerk
Attys.

March 18, 1930.  C. O. K. LAUBE  1,750,717
BOX MAKING MACHINE
Filed Jan. 26, 1927   9 Sheets-Sheet 8

Inventor
Clemens Otto Kurt Laube, Deceased,
Friedrich Bernhard Fischer, Executor
By: Marks & Clerk
Attys.

March 18, 1930.  C. O. K. LAUBE  1,750,717
BOX MAKING MACHINE
Filed Jan. 26, 1927   9 Sheets-Sheet 9

Inventor:
Clemens Otto Kurt Laube, Deceased
Friedrich Bernhard Fischer, Executor
By: Marks & Clerk
Attys.

Patented Mar. 18, 1930

1,750,717

UNITED STATES PATENT OFFICE

CLEMENS OTTO KURT LAUBE, DECEASED, LATE OF DRESDEN, GERMANY, BY FRIEDRICH BERNHARD FISCHER, EXECUTOR, OF DRESDEN, GERMANY

BOX-MAKING MACHINE

Application filed January 26, 1927, Serial No. 163,813, and in Austria November 29, 1926.

Figure 1:
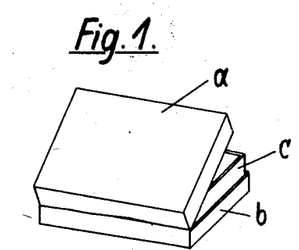
Figure 1 is a perspective view of the completed box.
Figure 2:
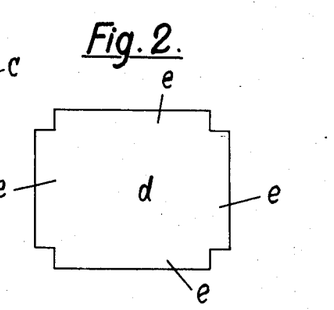
Fig. 2 is a plan view of the blank from which the box is made.
Figure 3:
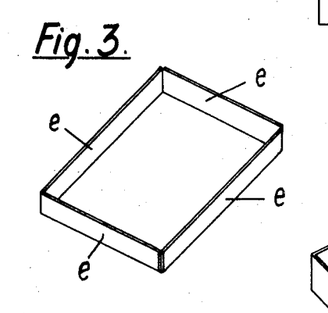
Fig. 3 is a perspective view of the blank in Fig. 2 with the side flaps $e$ in folded positions.
Figure 4:
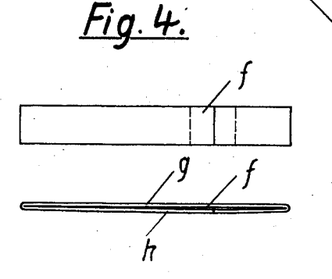
Fig. 4 is an elevational and a plan view of the box tenon in collapsed position.
Figure 5:
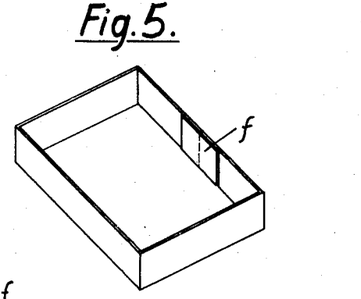
Fig. 5 is a perspective view of the tenon in opened position.

This invention relates to a machine for the manufacture of the under parts of boxes from cardboard, wood or the like with inserted border tenon strip for engagement with a lid. Blanks are produced to form the under part of known cardboard boxes for the packing of cigarettes or the like of the kind shown by way of example in Figure 1 of the accompanying drawings. This blank consists of a lid member or upper part $a$ and an under part $b$, which is equipped with an inserted tenon border $c$, which, when the box is shut, is overlapped by the side walls of the upper part $a$. The under part, consisting of the two members $b$ and $c$, is manufactured in a known manner by first forming a blank $d$ with four marginal flaps $e$, as illustrated in Figure 2. The marginal flaps are then bent up to produce the half finished under part, as shown in Fig. 3. Into this under part is inserted the border tenon $c$. The strip for the border tenon, as shown in Fig. 4, is closed by fixing the two ends of the strip together by means of a covering piece $f$ stuck on to them at the point where the two ends abut against one another. The closed annular strip structure thus produced is flattened out in such a way that the two halves $g$ and $h$ of the strip bear flat against one another and in this strip shape the border tenon blank is introduced into the machine. The border tenon must then, for the purpose of being inserted into the bottom member, according to Fig. 3, be spread out, that is to say, brought into the form shown in Fig. 5.

Devices are known which manufacture blanks according to Fig. 2 and bend up the marginal flaps $e$. There are also devices known for coating border tenon strips with glue on the outer side in preparation for their insertion by hand, in order that after insertion in the bottom member, according to Fig. 3, they can be connected with the side walls $e$ by adhesion. Presses are also known which press the inserted border tenon firmly against the side walls $e$.

The new machine is characterized by a two-part conveyer device in which the piece of work is held fast by means which simultaneously press the border strip completely into the bottom member of the box and guide the piece of work to a movable abutment which is coupled to a distending device, which, in consequence of the piece coming into contact with it, actuates the distending device in such a direction that by the latter a pusher is released, which pushes the piece into a press, which is equipped with an expansible upper stamp, which enters into the bottom member of the box, and by the expansion of which the border tenon is pressed firmly against the walls of the bottom member of the box, which are supported in the lower stamp.

This machine which is novel both in its construction as a whole and in the construction of its individual parts, is illustrated in the accompanying drawings in which.

Figs. $6^a$, $6^b$ and $6^c$ are side elevations of the machine.

Figs. $7^a$, $7^b$ and $7^c$ are plan views of the machine, Figs. $6^a$ and $7^a$ showing the left hand end, Figs. $6^b$ and $7^b$ the central part, and Figs. $6^c$ and $7^c$ the right hand end of the machine.

The machine illustrated as a whole in Figs. 6 and 7 will first be described as regards its arrangement and method of working without going into the construction of the individual parts.

From a spool 1, which is rotatably supported in a bearing 2, is unwound a strip 3 of paper or cardboard, from which the blank *d* shown in Fig. 2 is to be stamped out. The strip is drawn off intermittently by a pair of delivery rollers 4, 5.

The lower delivery roller is stationary and is rotatably supported, and it is continuously rotated in the direction of the arrow in Fig. 6 by means of a chain wheel 6 mounted upon its shaft. The driving is effected from a driving shaft 7 provided near the left hand end of the machine, a chain wheel 8 being provided on this shaft, with a chain 9 passing round it, which is also passed round a further chain wheel 10, upon an intermediate shaft 11 near the right hand end of the machine. Thus the shaft 11 is rotated by the chain 9 and from this shaft is driven by means of a chain 14, a shaft 13 supported above a standard 12 of the machine, a chain wheel 15 being mounted upon the shaft 11 and a chain wheel 16 upon the shaft 13, the chain 14 passing round these two chain wheels. By a further chain wheel 17 mounted upon the shaft 13, is driven by means of a chain 18, the chain wheel 6 already mentioned, upon the shaft of the lower delivery roller 5.

The upper delivery roller 4 is carried by a weight-loaded lever 19, which is rotatably arranged at 20, and carries at its other end a stamp 21. When the lever 19 is swung upwards, the roller 4 is lifted off the roller 5, so that the strip lying between these two rollers can now be conveyed no further. Under these circumstances the stamp 21 at the same time places itself upon a table support 22, over which the strip runs, and clamps the strip, so that it is held fast in its position during the stoppage. The raising of the upper roller 4 is effected by cam discs 23 and 116, which are mounted upon the shaft of the lower roller 5 and which cooperate with an anti-friction roller 24 mounted upon the shaft of the roller 4 in such a way that during part of the revolution of the cam disc 23 the anti-friction roller of the cylinder 4 is lifted by the aid of the anti-friction roller 24 off the cylinder 5, but during the other part of the rotation is brought into engagement with the cylinder 5.

The strip 3 being pushed intermittently in this manner passes into the stamping tool 25, the upper stamp 26 of which can be moved up and down in vertical guides 27, this being effected by means of a connecting rod 28 which is pivoted at one end, at 29, to the stamp 26, and at the other end at 30, to a disc crank 31 on the shaft 13. To the upper stamp 26 is screwed on the under side a carrying block 32, which carries the knives 33, which, during the descent of the upper stamp, in conjunction with the lower stamp 34 and the cutting knives 35, cut the blank out of the strip 3 and at the same time bend the borders *e* downwards to the form shown in Fig. 3, the creases being moreover impressed. The blanks thus stamped out of the strip and bent to their finished position are automatically deposited by an ejector not shown in the drawing upon a conveyer band 36 arranged in front of the stamp. The conveyer band runs endlessly over a guiding pulley 37 at one end and over a driven guiding pulley 38 at the other end. The driving of these pulleys is effected from the shaft 7 of the machine, a chain wheel 39 being mounted upon the pulley shaft and being rotated by means of a chain 40 from a chain wheel 41 mounted upon the shaft 7. The blanks passing on to the conveyer band 36 are conveyed to the working table 42, which is carried by standards 43 and upon which the conveyer band bears, the latter being guided downwards within reach of the driven guiding pulley 38 through a slot in the table. Above the guiding pulley 38 is positioned upon the table a roof-shaped guiding surface 44 in the path of the blank arriving upon the band 36, this guiding surface having the result that the blanks arriving on either one side or the other of the band are placed upon the table surface 42.

Now it is necessary for the border tenon strips to be brought to the place where the blanks are deposited upon the table 42. The border tenon strip blanks in the form shown in Fig. 4 are piled up in a vertical column 45. From this column the lowest border tenon strip blank passes from time to time on to the upper part of an endless conveyor band 46, which passes round the two conveyor pulleys 47 and 48. Of these the conveyor pulley 48 is driven, by means of a pinion 50, which is mounted upon its shaft 49 and which meshes with a pinion 51. The pinion 51 is mounted upon a shaft 52. This shaft is rotated from a shaft 55 by a spur wheel gearing 53, 54. The shaft 55 is continuously rotated from the driven shaft 11 already mentioned, by means of bevel wheel gearing 56, 57. The shaft 52 is however made in two parts, the two parts being capable of being brought into or out of engagement with one another by a clutch 58 slidable upon the shaft. On the other hand from the shaft 55, by a spur wheel countershaft 54, 107, and 108, by means of bevel wheel gearing 59, 60, is driven a shaft 61, which is likewise made in two parts, the two parts being capable of being brought into or out of engagement with one another by a clutch 62. On the shaft 61 is mounted a series of cord pulleys 63, the parallel cords 64 of which run to cord pulleys 65 upon a shaft 66. Upon these parallel cords the border tenon blank is conveyed. The conveyor band 46 first supplies the blank to a pair of gluing cylinders 67, 109 and to a few pairs of conveying cylinders 110, 111, the said gluing cylinders and conveying cylinders being kept in continuous rotation by means of belts or the like from the shaft 55 by countershaft gearing. This pair of gluing cylinders provides the strip-shaped border tenon blank with adhesive on one of its longitudinal edges on both sides. These conveyor cylinders convey the border tenon blank coated with adhesive to the upper side of the cords 64. The cords thus form a conveyor track and convey the border tenon blank to the place where the box blanks have already arrived, into which the border tenon blanks are to be inserted.

The person in charge, who is able to observe from above through the cords, the arriving box blanks, which are delivered upon the conveyor track 36 lying underneath the cords, takes the border tenon blanks off the cord conveyor track and places them into the box bottoms that arrive at the table surface 42.

In the event of the stamp 25 not supplying sufficient blanks or hardly supplying any blanks, the supply of border tenon blanks can be suspended by means of a single handle. The handle 68 provided within reach of the table 42 serves to slide longitudinally a rod 69, which by means of a bell-crank lever 70 is connected with a controlling rod 72, which is guided for longitudinal displacement in bearings 71. This rod is connected with the clutch 62, while on the other hand a bell-crank lever 112 is connected with the clutch 58. By sliding the rod 69 it is thus possible to effect simultaneously the opening of the clutches 58 and 62. By this means the conveyor band 46 and the cord track 64 are simultaneously stopped. When the stamp 25 again normally delivers the box bottoms, the necessary supply of the tenon border strips can be established afresh by closing the clutches. The insertion of the border tenon strips in the blanks may alternatively proceed mechanically without the assistance of an attendant, as will be hereinafter described.

The blanks provided with inserted border tenon strips pass on to the upper part of an endless band 73, which passes over the two guiding cylinders 74 and 75, the guiding cylinder 75 being driven from driving shafts 7. For this purpose there is mounted upon the shaft 7 a chain wheel 76, the chain 77 of which is secured over a chain wheel 78, to the shaft 79 of the cylinder 75, this shaft being journalled in the two bearings 80.

With the conveyer band 73 there co-operates a second conveyer band 81 which passes over the guiding cylinders 82 and 83, of which the guiding cylinder 82 is driven by the driving shaft 7, a chain wheel 84 being provided upon the shaft 7, the chain 85 of which runs over a chain wheel 86 on the shaft 87 of the guiding cylinder 82. As will be obvious, the guiding cylinder 82 is placed at a higher level as compared with the otherwise horizontally running parts of the endless band 81, the interposed guiding rollers 88 and 89 serving for the guidance of the band. The under side of the endless band 81 runs above the endless band 73 and parallel to the upper side thereof, so that the blank deposited upon the upper side of the endless band 73 and provided with the inserted border tenon strip must pass between the two adjacent sides of the endless bands 73 and 81. Under these circumstances the bent-up end part of the endless band 81 forms an admission mouth, and the distance between the two intermediate operative parts of the endless bands is so dimensioned that the work is held between them under pressure, whereby the border tenon strip is pressed firmly against the bottom of the box member in which it has already been inserted.

The lower conveyer band 73 terminates in front of a table surface 90, while the upper conveyer band 81 traverses this table surface. As the table surface is arranged on a level with the upper side of the lower conveyer band 73, the upper conveyer band takes the piece of work with it and pushes it on to the table surface.

The pieces of work fed by the conveyer band 81 on to the table 90 strike against a stop 91, which is movably supported and is coupled to a locking device. This locking device prevents a pusher 92, which is slidably guided on the table surface transversely to the direction of feed of the pieces of work, from executing its movement until there is a piece of work bearing against the stop 91. Owing to the movement of the stop thereby occasioned, the locking is released and the pusher set free for its driving means, so that the pusher can seize the piece of work lying in front of it and deliver it into a press 93. The pusher is driven for example by a cam disc and corresponding levers, a spring being so arranged that when it is unstressed the introduction of the box members is effected. If the pusher is locked, owing to there being no box members present, the spring remains stressed and the levers come temporarily out of engagement with the cam. In the press, by means of an extensible upper stamp 94, the inserted border tenon strip is pressed firmly against the walls of the box member. The upper stamp is secured to a slotted pusher 95, which slides up and down in vertical guides 96. This upper stamp is controlled by means of a connecting rod 97, which is pivotally attached at 98 to the pusher 95 and at the other end, at 99, to the crank 100. This crank is driven from the shaft 101, a chain wheel 102 being mounted upon this shaft and being driven by means of a chain 103 from the driving shaft 7, the chain being passed over a chain wheel 104 mounted upon the shaft 7.

The driving shaft 7 itself is driven in the usual manner by means of a belt pulley 105 and an idle pulley 106.

The individual parts of the machine will now be described in respect of their construction:—

*The device for the further delivery of the articles of work after insertion of the border tenon*

Figure 8:
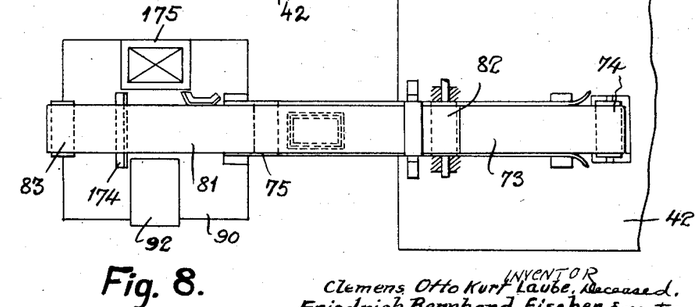
Figures 8 and 9 show in plan and in front elevation respectively a transporting device for box members.
Figure 9:
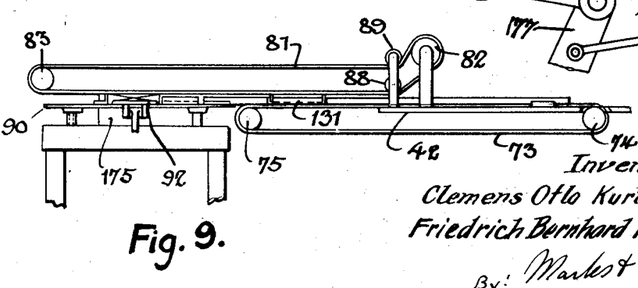

This device is illustrated in plan and in front elevation in Figs. 8 and 9 respectively.

The thing to be done is to convey the work from the delivery point over the table 42 to the point of removal on to the table 90, from which the work is supplied to the press 93.

Besides a conveyor band carrying the articles, a second conveyer band is provided in such a way that the second conveyer band seizes the articles from above. This conveyer band traverses the table 90, that is to say, the track for pushing the articles into the press in which the border tenon insertion is pressed firmly against the side wall of the box bottom.

This new conveyer device is furthermore advantageous on account of the fact that individual articles can be delivered over the end of the lower transporting band, so that in the event of interruptions in the work no articles remain lying upon the lower transporting band. From the work table 42, over which the carrying transport band 73 is passed in a known manner round the cylinders 74 and 75, the box member is carried away by being placed upon the band 73. The second or driving transport band 81, which passes round the cylinders 82 and 83, first begins at the edge of the table, in order that the depositing of the box members by the attendants may not be made more difficult. Both the bands 73 and 81 then deliver the box member 131 jointly to the machine. Immediately in front of the pushing-in table 90 of the machine, the carrying transport band 73 ceases to act, and the driving band 81 guides the article up to a stop 174, where it is seized by the pusher 92 and introduced into the implement 175.

*The device for carrying box members into the press*

Figures 10, 11:
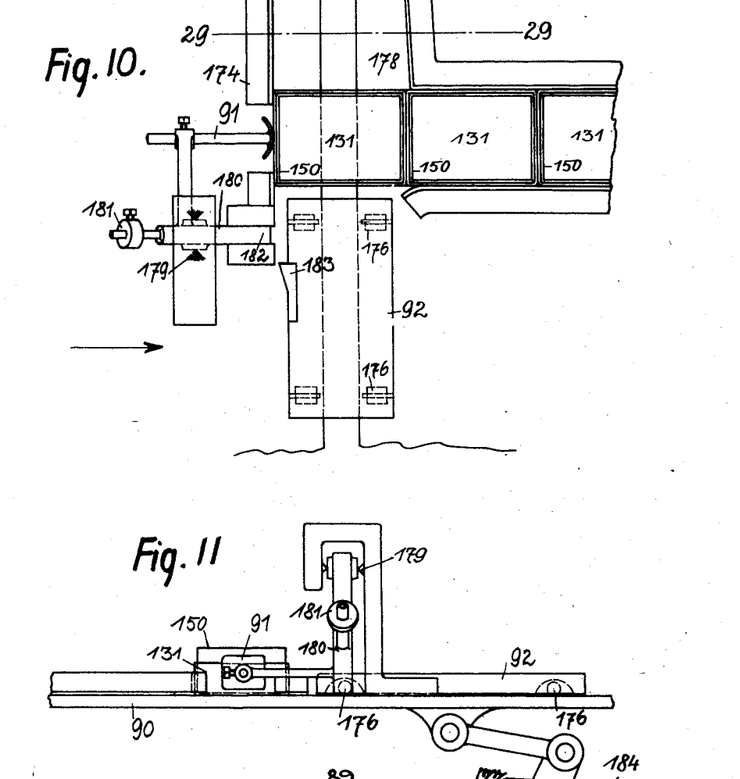

This device is illustrated in plan in Fig. 10.

Figures 6, 12, 13:
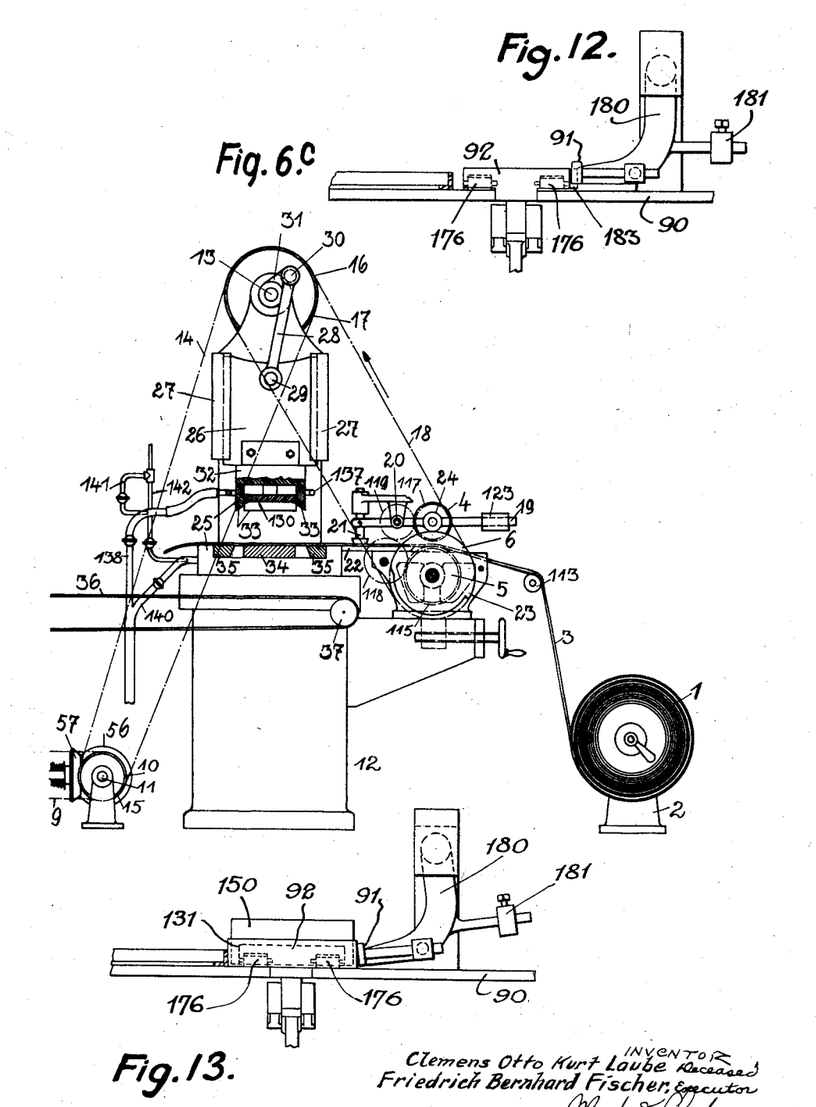
Figures 10 to 13 illustrate the feeding slide and the locking thereof in various working positions.
Figure 6A:
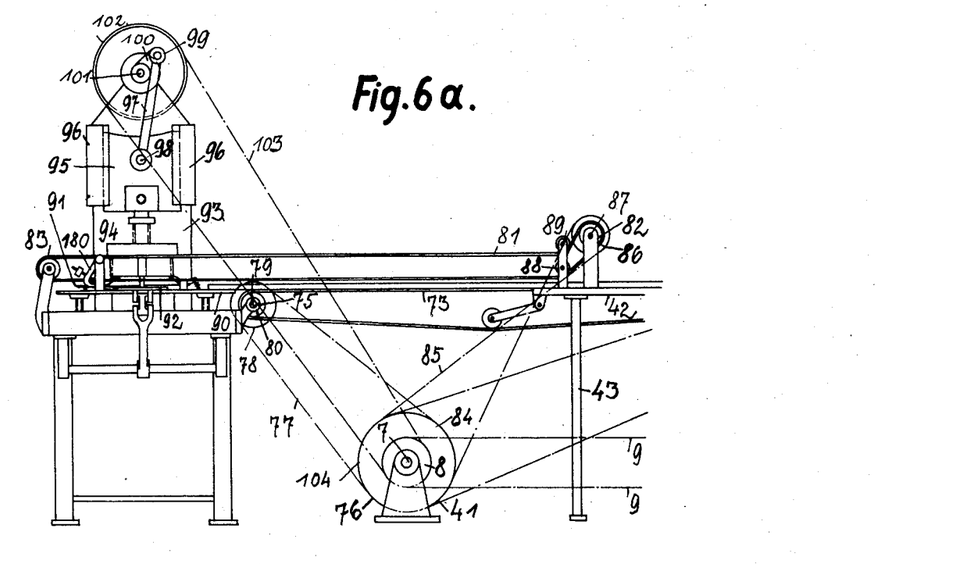
Figure 6B:
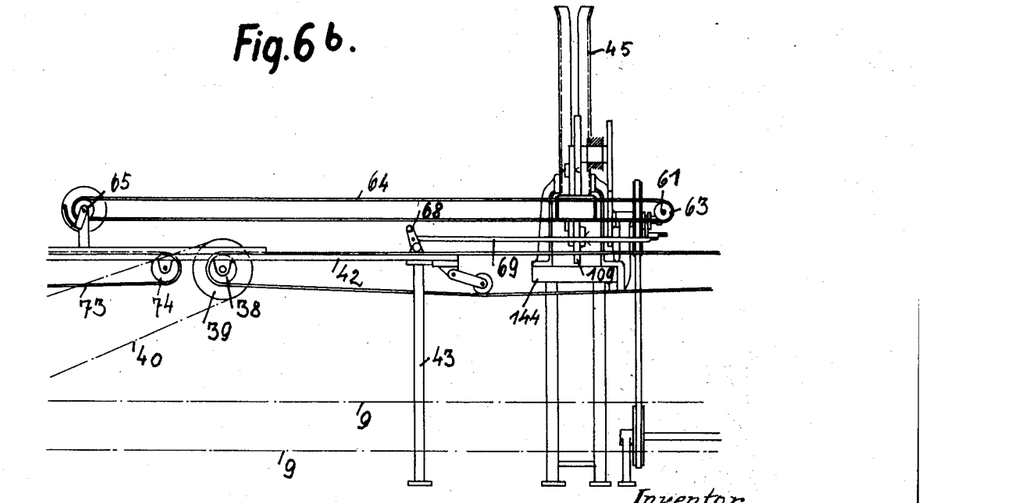
Figure 7A:
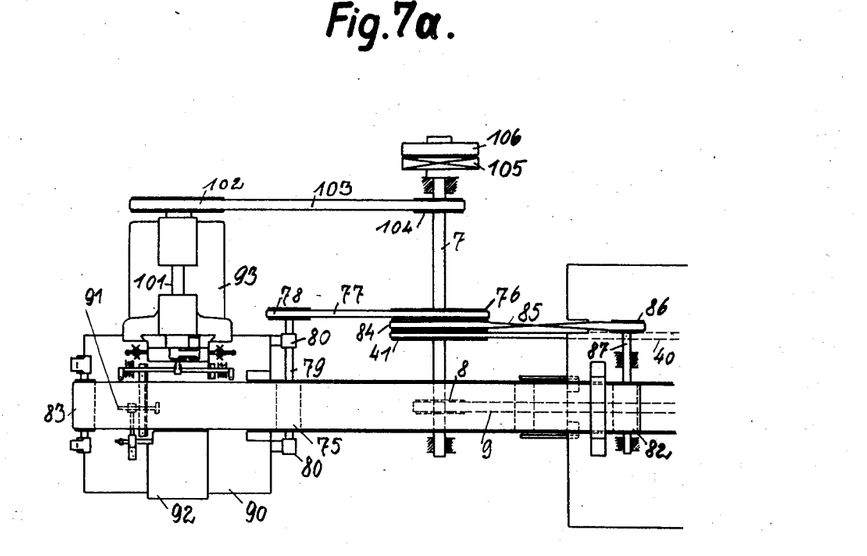
Figure 7B:
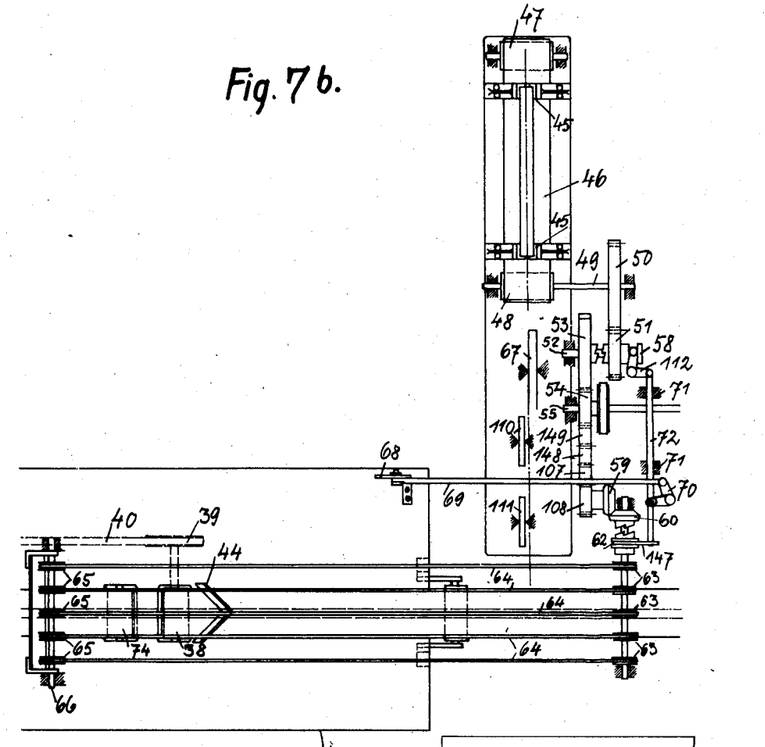
Figure 7C:
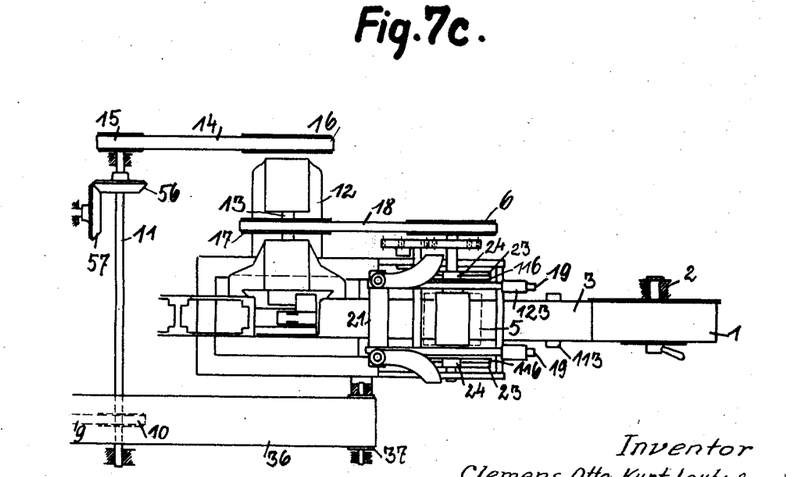

Fig. 11 is a side elevation thereof in the direction of the arrow shown in Fig. 10;

Fig. 12 is a cross section on the line 29—29 in Fig. 10;

Fig. 13 is likewise a cross section on the line 29—29 in Fig. 10, but with the stop in a different working position.

On the table 90 of the press the pusher 92 is slidably supported upon rollers 176 or in prisms and is moved to and fro in the introducing track 178 by the link 177. The articles, box members 131 for example, are brought in a known manner from the side in front of the pusher 92 into the introducing track 178, and there strike against the adjustable feeler 91 of the locking piece 180 pendulously suspended in the point 179, the said feeler projecting into the track 178. By this means both the feeler 91 and the locking piece 180 are pushed back out of the track 178, and the pusher 92 can execute the introducing movement. Now if once the article 131 is not introduced at the right time or is not introduced far enough into the introducing track 178, the feeler 91 remains unaffected and the locking piece 180 remains in the locking position under the action of the weight 181, that is to say, the locking piece 180 projects with its front part 182 into the introducing track 178, so that the pusher 92, with its projection 183, strikes against it during the forward movement and is stopped. As soon as a box member 131 is again brought into the correct position in front of the pusher 92, the locking piece opens the way for the pusher, as previously described, and the work is continued. The counting device for the working strokes of the machine must in this arrangement be pivoted to the pusher 92 or to a member moving with it. In the example illustrated the coupling rod 184 has been secured to the counting mechanism known in itself, on the link 177.

It is also to be observed that instead of a pendulously hanging locking piece 180 a readily rotatable lever may be employed, which is moved by a weight or a spring, and pushes a locking member into the track.

*The press for finally securing the border tenon insertion in the box member*

Figure 14:
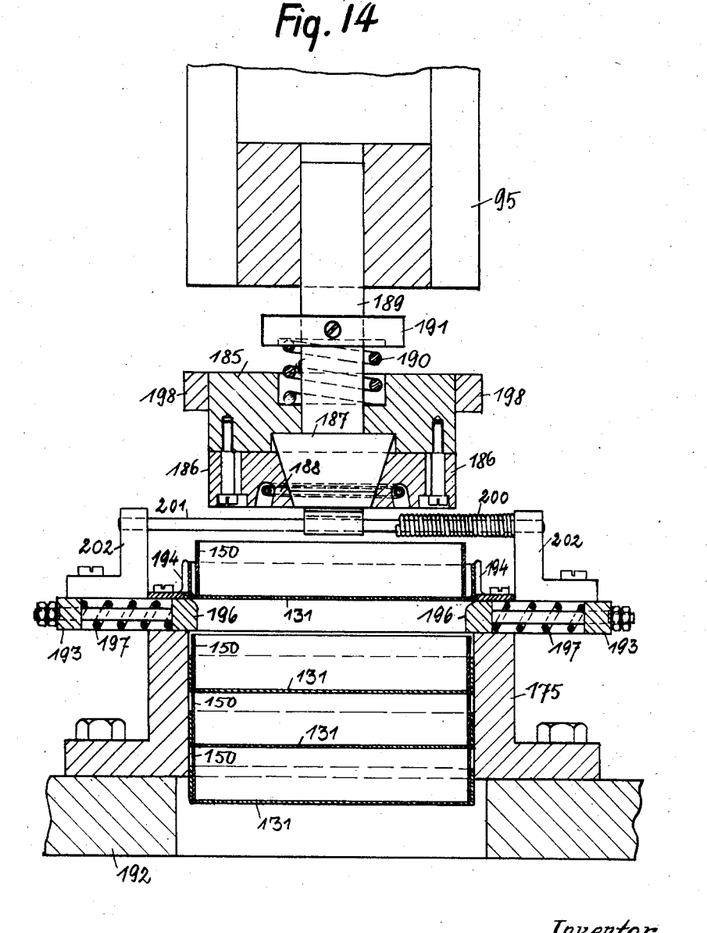
Figures 14 to 18 show in section, in plan and in side view respectively, in various working positions, the implement for the pressing of the neck strips.
Figure 15:
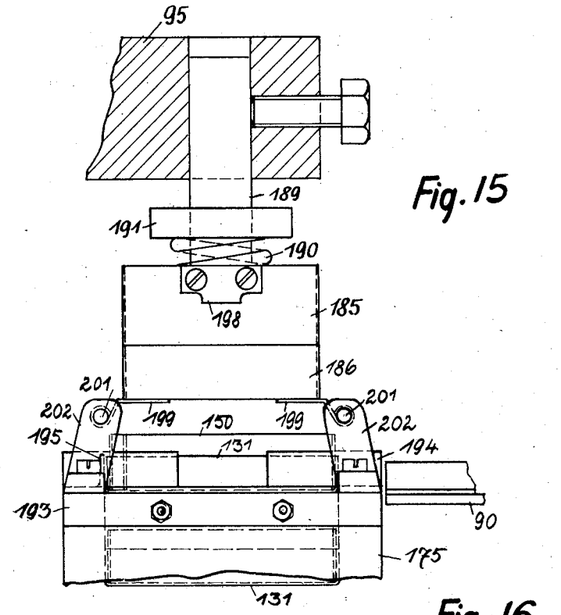
Figure 16:
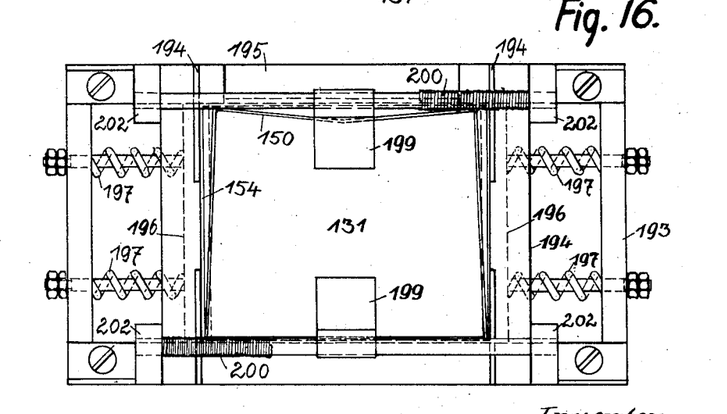

This device is illustrated in sectional elevation in Fig. 14;

Fig. 15 is a side elevation thereof looking in the direction of the arrow shown in Fig. 14;

Fig. 16 is a view from above, with the upper stamp left out.

The upper implement consists of a stamping plate 185 to which the four side parts 186 are so secured that they can be pressed outwards by the cone 187, but are drawn furthest inwards in their normal position by the ring spring 188. The cone 187 has at the top a cylindrical elongation, the stamp 189, which is slidably guided in the stamping plate 185 and serves at the same time for fastening the implement in the ram 95. Normally the stamping plate 185 bears upon the cone 187, this being effected by the spring 190, which is arranged between the stamping plate 185 and the positioning ring 191 on the stamp 189.

The lower implement 175 is a rectangular through-jacket, which has no bottom, and which is secured to the press table 192, the press table having an aperture which corresponds at least to the internal cross-sectional dimensions of the through-jacket.

The box members provided with glued border strips are pushed by the pusher 92 over the upper aperture of the through-jacket. In order to enable the box members to be accurately centered to the axis of the through-jacket, two guiding ledges 194 and a stop 195 are arranged upon the frame 193, which is secured to the through-jacket. A distortion of the box member out of its rectangular form upon being pushed in is prevented by the fact that in the frame 193 two further guiding pieces 196 are arranged, which are pushed by the springs 197 somewhat over the aperture of the through-jacket, and present a firm bearing surface to the box member.

When a box member has been pushed in, this position being shown in Figs. 14 and 15, the ram 95, which is moved up and down in a known manner by a crank, eccentric or cam drive, moves downwards, and the upper implement moves into the box member until the upper implement strikes against the bottom of the box member. During the further downward movement of the ram 95 the upper implement presses the sliding pieces 196 to the side and presses the box member into the through-jacket. When the latter has been pushed sufficiently far, the stops 198, which are secured to the stamping plate 185, come into contact with the lower implement. By this means the stamping plate 185 is prevented from going further downwards, so that the stamp 189 moving downwards with the ram 95, presses the side members outwards with the cone 187. Thus the side members press the border strips firmly against the sides of the box members, which bear against the wall of the heated through-jacket. By this means a firm connection of the tenon strips and the box members is obtained.

The stamp 189 now goes up again into its original position. The cone 187 owing to the spring 190 again comes to bear upon the stamping plate 185, and the ring spring 188 pulls the side members 186 inwards, so that the lateral pressure immediately ceases, and the upper implement easily slips out of the box member, while the latter remains behind in the through-jacket.

During the pressing of the box member into the through-jacket, the box members previously treated and already located therein, are at the same time pushed further downwards, the lowermost box member being pushed out of the through-jacket and dropping into a basket or the like standing under the press.

*The device for smoothing the border tenon insertion before the upper stamp of the press becomes operative*

Figure 17:
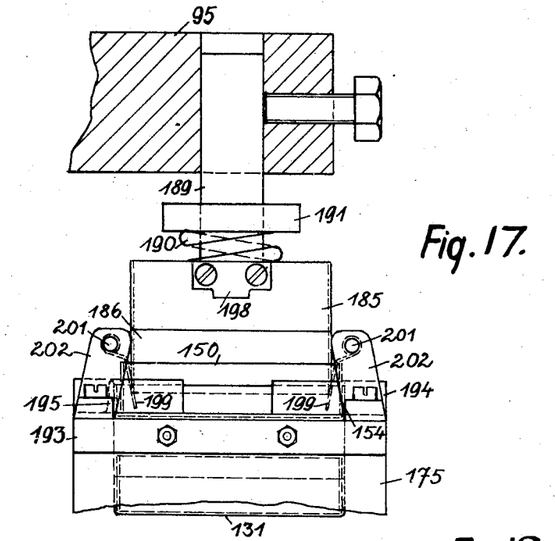
Figure 18:
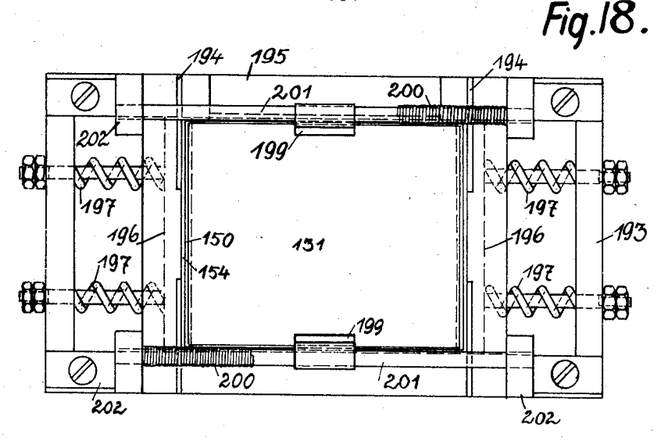

This device is shown in Figs. 14 to 16, to which Figures 17 and 18 are supplementary.

In the position shown in Fig. 14 the stamp 189 is located in the highest position, and the smoothing fingers 199 are directed horizontally and are pressed by springs 200 against the lower stamping surface. The smoothing fingers 199 are secured to shafts 201, which are journalled in the bearing 202 of the through-jacket 175. Now if a box member 131, with the border strip 150 inserted therein, has been pushed over the through-jacket aperture, the stamp 189 begins to descend and thus pushes the smoothing fingers 199 before it, these being thereby rotated through 90° out of the horizontal into a vertical position. Under these circumstances the smoothing fingers 199 come into contact with the creased border tenon surface and press the latter against the side wall 154 of the box member, so that there is nothing to hinder the pushing of the upper implement into the box member provided with a border strip.

This moment is illustrated in Figs. 17 and 18. The smoothing fingers 199 will therefore slip out of the box member if the latter is pushed into the through-jacket 175.

When the stamp ascends, the smoothing fingers 199 rotate back into the horizontal position again, this being effected either by springs 200, as shown in Figs. 14 to 18, or by weights.

What is claimed is:—

1. A machine for the manufacture of cardboard boxes with inserted border tenon strips comprising a two-part conveyor device for the conveyance of the box member containing the border tenon strip, a locking device, and a movable stop coupled to the locking device, the two-part conveyer device for the box members containing the border tenon strips consisting of a conveyer belt (73) to carry the box member and a second conveyer belt (81) adapted to engage the border tenon strip from above, and press it into the correct position on the bottom of the box member, the belt (81) extending beyond the belt (73) and guiding the box right up to the movable stop coupled to the locking device, and the machine further comprising a table (90) forming a continuation of the upper side of the conveyer belt (73).

2. A machine for the manufacture of cardboard boxes with inserted border tenon strips comprising a two-part conveyer device for the conveyance of the box member containing the border tenon strip, a locking device, and a movable stop coupled to the locking device, the two-part conveyer device for the box members containing the border tenon strips consisting of a conveyer belt (73) to carry the box member and a second conveyer belt (81) adapted to engage the border tenon strip from above, press it into the correct position on the bottom of the box member, and guide the box right up to the movable stop coupled to the locking device, said locking device including a pendulously supported locking member (180), means for urging said locking member into a position in which it locks the pusher in a retracted position, and means for releasing the pusher from the locking member when a box member comes into contact with the movable stop.

3. A machine for the manufacture of cardboard boxes with inserted border tenon strips, comprising a work table (42) upon which border tenon strips can be inserted in box members, a two-part conveyer device for the further conveyance of the box member containing the border tenon strip, the two-part conveyer device for the box members containing the border tenon strips consisting of a conveyer belt (73) to carry the box member and a second conveyer belt (81) adapted to engage the border tenon strip from above, and press it into the correct position on the bottom of the box member, the belt (81) extending beyond the belt (73) and guiding the box right up to the movable stop coupled to the locking device, a table (90) forming a continuation of the upper side of the conveyer belt (73), a press, a lower stamp and an expansible upper stamp in said press, a pusher adapted to push a box member into said lower stamp, driving means for said pusher, a locking member adapted to lock said pusher in a retracted position when there is no box member in a position of readiness to be pushed into the lower stamp, a stop adapted to be moved by a box member when said box member comes into a position of readiness to be pushed into the lower stamp, a connection between the locking member and the stop, said connection causing the locking member to release the pusher when a box member moves the stop, the upper stamp being adapted to enter the box member and expand the border tenon firmly against the side walls of the box member.

4. A machine for the manufacture of cardboard boxes with inserted border tenon strips comprising a press, a lower stamp and an expansible upper stamp in said press, the upper stamp being adapted to enter the box member and expand the border tenon firmly against the side walls of the box member, and oscillatable smoothing fingers resiliently pivoted on opposite sides of the press, said smoothing fingers being adapted to be rocked downwards through a right angle by the descending upper stamp to press the border tenon strip smoothly against the sides of the box member.

5. A machine for the manufacture of cardboard boxes with inserted border tenon strips comprising a press, and a lower stamp and an expansible upper stamp in said press, the expansible upper stamp of the press comprising a stamping plate (185), four laterally movable side members (186) secured to said stamping plate, projections (198) located laterally on the stamping plate (185) and adapted to come into contact with the lower stamp of the press as the upper stamp descends, a cone adapted to press said movable side members outwards when said projections (198) come into contact with the lower stamp, and a ring spring adapted to retract the movable side members during the ascent of the upper stamp.

6. A machine for the manufacture of cardboard boxes with inserted border tenon strips comprising a press, and a lower stamp and an expansible upper stamp in said press, the lower stamp of the press being a rectangular through-jacket (175) without a bottom whereby the border tenon strips are pressed against the side walls of the box bottom to make a firm union.

7. A machine for the manufacture of cardboard boxes with inserted border tenon strips comprising a press, and a lower stamp and an expansible upper stamp in said press, the lower stamp of the press being a rectangular through-jacket (175) without a bottom, and the machine further comprising a frame (193) located upon said through-jacket, two lateral guiding ledges (194) and a stop (195) adjustably secured to said frame for positioning the box member in the press, and two sliding pieces (196) resiliently arranged in said frame to press sideways against a box member being introduced into the through-jacket whereby the border tenon strips are pressed against the side walls of the box bottom to make a firm union.

In testimony whereof I have signed my name to this specification.

FRIEDRICH BERNHARD FISCHER,
*Executor of the Estate of Clemens Otto Kurt Laube, Deceased.*